US008542289B1

(12) United States Patent
McClatchie

(10) Patent No.: US 8,542,289 B1
(45) Date of Patent: Sep. 24, 2013

(54) MAPPING A TWO-DIMENSIONAL IMAGE TO A CYLINDRICAL SURFACE USING A TUNED DISTORTION CURVE

(75) Inventor: Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 974 days.

(21) Appl. No.: 12/367,905

(22) Filed: Feb. 9, 2009

Related U.S. Application Data

(60) Provisional application No. 61/027,264, filed on Feb. 8, 2008.

(51) Int. Cl.
*H04N 5/228* (2006.01)

(52) U.S. Cl.
USPC .. 348/222.1; 348/36; 348/218.1; 348/211.11; 382/275; 359/725

(58) Field of Classification Search
USPC ............... 348/222.1, 36, 218.1; 359/725; 382/275
See application file for complete search history.

(56) References Cited

U.S. PATENT DOCUMENTS

| | | | | |
|---|---|---|---|---|
| 4,202,599 A | * | 5/1980 | Tosswill | 385/120 |
| 5,115,266 A | * | 5/1992 | Troje | 396/21 |
| 6,002,430 A | * | 12/1999 | McCall et al. | 348/207.99 |
| 7,277,118 B2 | * | 10/2007 | Foote | 348/36 |
| 2005/0041219 A1 | * | 2/2005 | Streid et al. | 353/98 |
| 2007/0002131 A1 | * | 1/2007 | Ritchey | 348/39 |
| 2007/0206945 A1 | * | 9/2007 | DeLorme et al. | 396/332 |
| 2007/0292046 A1 | * | 12/2007 | Johnson | 382/275 |

FOREIGN PATENT DOCUMENTS

| WO | WO 2007/110097 A1 | 10/2007 |
|---|---|---|
| WO | WO 2008/152441 A2 | 12/2008 |

* cited by examiner

*Primary Examiner* — Roberto Velez
*Assistant Examiner* — Cynthia Segura
(74) *Attorney, Agent, or Firm* — Sterne, Kessler, Goldstein & Fox P.L.L.C.

(57) ABSTRACT

In a typical two-dimensional rectilinear image, all pixel widths are constant across the image. If the two-dimensional rectilinear image is mapped to a cylindrical surface, the pixels at the edge of the image are viewed at an angle, making the effective width of the pixels at the edge smaller than the effective width of the pixels in the interior of the image. This problem may be solved by applying a tuned distortion curve to the two-dimensional rectilinear image, which makes the pixels near the edge of the image wider than pixels in the interior of the image. When pixels that have been distorted in this manner are mapped to a cylindrical surface, the effective pixel width is uniform. A lens with a tuned distortion curve built into its optical profile captures at least a portion of the surrounding imagery such that the resultant image has uniform resolution when projected onto a virtual cylinder centered around a viewer.

13 Claims, 8 Drawing Sheets

MAPPING A TWO-DIMENSIONAL IMAGE TO A CYLINDRICAL SURFACE USING A TUNED DISTORTION CURVE

CROSS REFERENCE TO RELATED APPLICATIONS

This patent application claims the benefit of U.S. Provisional Patent Application No. 61/027,264, filed on Feb. 8, 2008, entitled "Mapping a Two-Dimensional Image to a Cylindrical Surface Using a Tuned Distortion Curve," which is incorporated by reference herein in its entirety.

BACKGROUND

1. Field

The present invention relates to uniform resolution image capturing and rendering.

2. Background

An online map service such as Street View by Google Inc. of Mountain View, Calif., allows users to navigate within street-level imagery of certain places for a virtual tour of these places. The images used are panoramic views of street level scenes with information related to the scenes to simulate the experience of virtually walking down a street and exploring the neighborhood.

High resolution cameras are employed to capture the street-level imagery. Typically a camera system comprising multiple cameras is mounted on top of a vehicle that travels along the streets, while the individual cameras capture portions of a panoramic image that are bound by their respective angular fields of view. The panoramic image may be, for example, a 360-degree panorama. Images captured by individual cameras are then stitched together to render the panoramic image. In order to simulate the feeling that a viewer is in the middle of a scene, the panoramic image should be projected along the surface of a cylinder centered around the viewer. Typically, when a two-dimensional rectilinear image of a scene is mapped onto a cylindrical surface, the pixels at the edge of the image within the field of view are viewed at an angle, making the effective width of the pixels at the edge smaller than the effective width of the pixels in the interior of the image. Thus, the viewer sees the image with non-uniform resolution, and the image appears distorted. This is especially true for cameras that employ ultra-wide-angle lenses, known as fish-eye lenses.

This problem may be solved by using individual cameras with narrow fields of view, such that the image-distortion is either not perceptible, or within an acceptable limit. However, this solution calls for an increased number of cameras to capture the entire panorama, and requires a more complicated stitching algorithm.

What is needed is a system and method for tailoring the distortion of the pixels of a two-dimensional rectilinear image, without sacrificing the angular field of view, such that a resultant image projected along the surface of a virtual cylinder appears to have uniform resolution.

BRIEF SUMMARY

Embodiments of the present invention employ an optical-distortion-tuning lens in order to capture and render at least a portion of a panoramic image with uniform resolution.

In an embodiment of the present invention, an imaging apparatus comprises a lens and an image sensor system. The lens has a built-in optical profile configured to introduce variable amounts of distortion to individual points of a rectilinear image of a scene within an angular field of view of the lens, such that a resultant image of the scene received by the image sensor system has a uniform resolution when the rectilinear image is projected on a portion of a surface of a virtual cylinder centered around a viewer.

Embodiments of the present invention enable an imaging apparatus to receive an image of a scene with a distortion-tuning lens, to generate a resultant image of the scene with a uniform resolution wherein the resultant image is a projection of a rectilinear image of the scene on a portion of a surface of a virtual cylinder centered around a viewer, and to capture and store the resultant image of the scene by an image sensor system.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. The drawings in which an element first appears is generally indicated by the left-most digit in the corresponding reference number.

One or more embodiments of the present invention will now be described with reference to the accompanying drawings.

DETAILED DESCRIPTION OF EMBODIMENTS

This specification discloses one or more embodiments that employ distortion-tuning lenses in high-resolution image-capturing devices in order to reproduce at least a portion of a uniform-resolution panoramic street-level imagery.

The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s)

described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Figure 1:
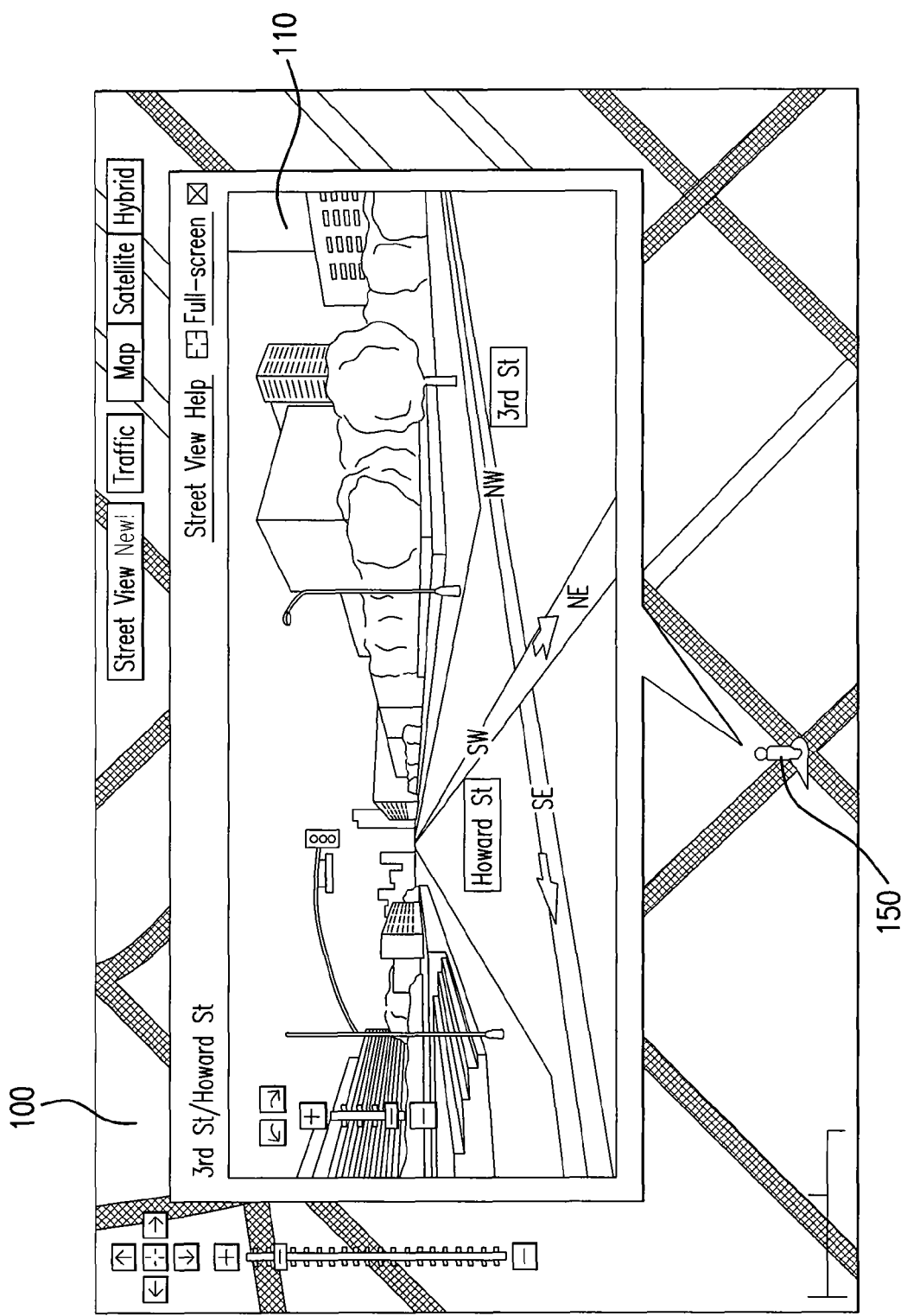
FIG. 1 shows an example panoramic street-level image.

An image capturing system may be used to create panoramic images, such as panoramic images of a surrounding location. An example system is the Street View system utilized by Google Inc. of Mountain View, Calif. The panoramic images may be assembled from multiple images, and these images may be stored in a photo database. FIG. 1 shows an example panoramic image 110 extracted from such a photo database. Image 110 represents a panoramic view that a viewer is expected to see when he or she is physically positioned at a location denoted by an icon 150 in the bottom center of an underlying map 100. As multiple images are captured corresponding to multiple directions, a user may enjoy full control of vantage points in a panoramic image. This feature is very advantageous for a number of location-based services, including, but not limited to, virtual tourism, remote surveillance, etc.

Figure 2:
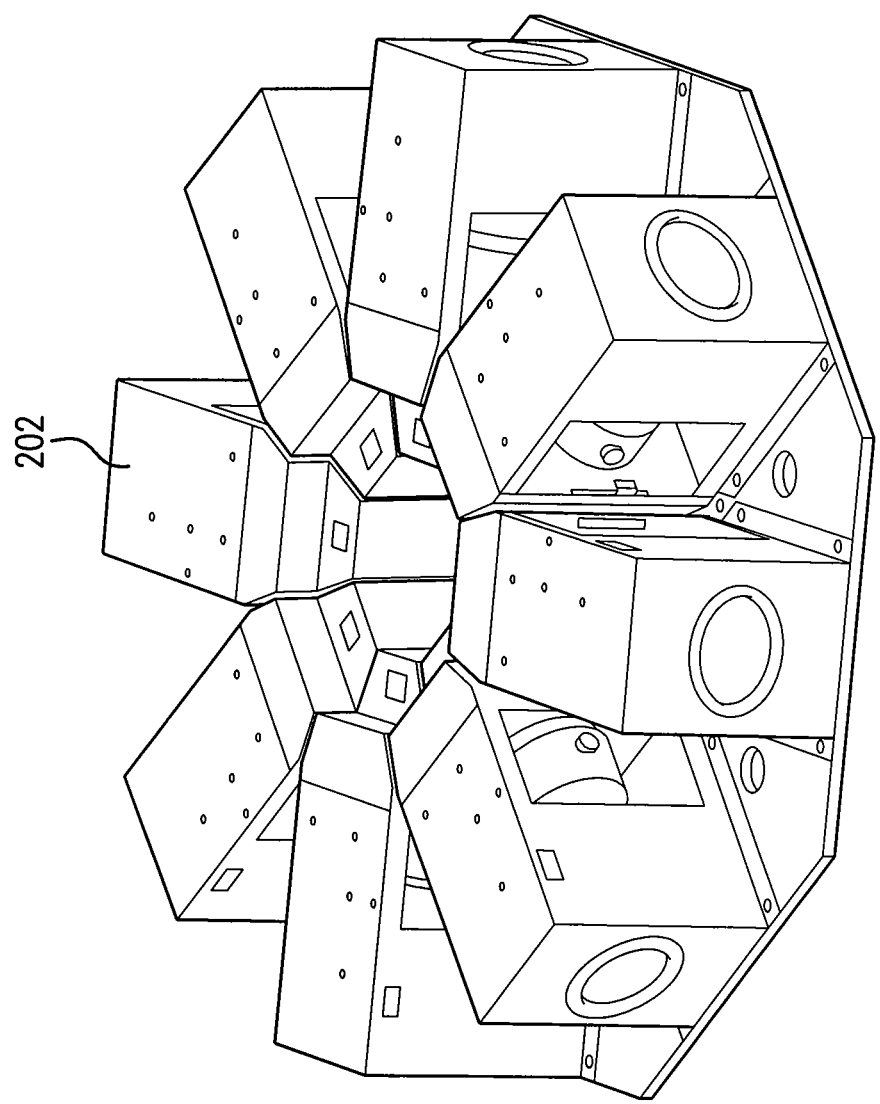
FIG. 2 is a diagram of a multi-camera system for capturing street-level imagery, according to an embodiment of the present invention.

FIG. 2 shows a representation of an image capturing system 200 comprising individual imaging apparatuses 202 arranged radially. Though FIG. 2 shows an embodiment with eight individual apparatuses 202 arranged radially, persons skilled in the art would appreciate that any number of individual apparatuses 202 may be used in a variety of configurations. Optical design of the individual imaging apparatus 202 takes into account several design factors associated with high-resolution video capture, such as, for example and without limitation, uniformity of resolution, depth of field, contrast, sensitivity, dynamic range of image sensors, motion blur, etc. Although system 200 will be described as capturing a 360-degree panoramic view, one of skill in the art will recognize that similar systems may be used to capture smaller panoramic views without departing from the spirit and scope of the present invention.

Figure 3:
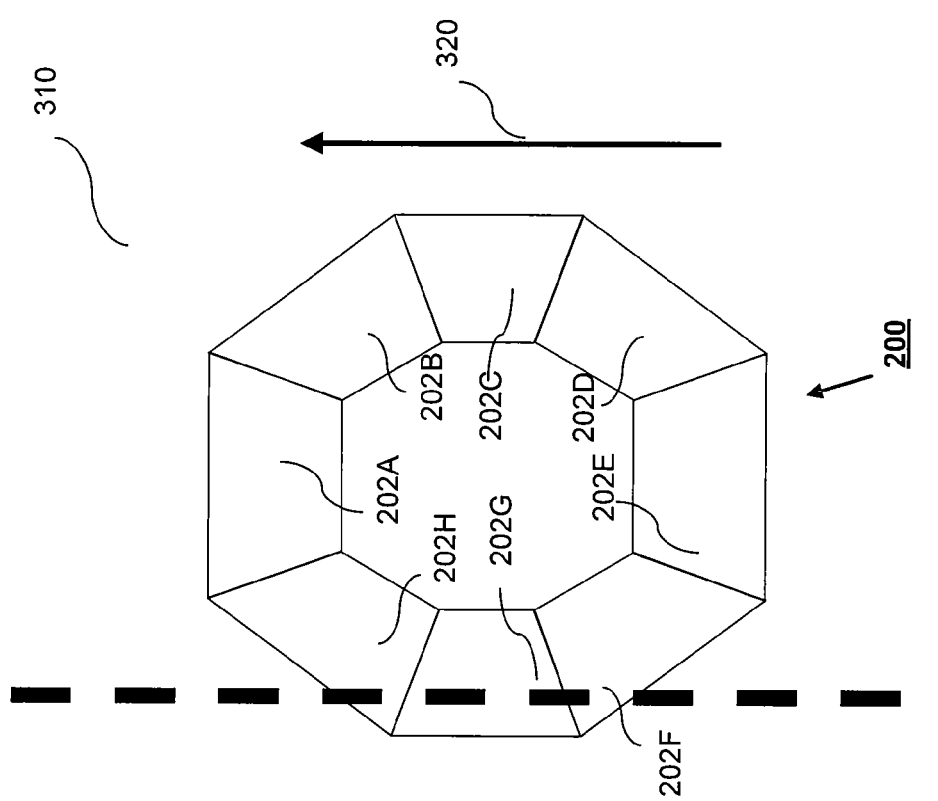
FIG. 3 is a top-view of a multi-camera system moving along a street, while capturing street-level imagery of the surroundings, according to an embodiment of the present invention.

FIG. 3 shows an embodiment where image capturing system 200 is mounted on a mobile platform, such as a vehicle traveling along a road 310 in the direction denoted by arrow 320. System 200 includes a set of fixed and/or variable focal length imaging apparatuses configured to capture a panoramic image of objects surrounding the system 200. This may include, for example, objects on both sides of the street 310, as well as objects in front of and behind the system 200. In the example of FIG. 3, apparatuses 202A, 202C, 202E, and 202G may have fixed focal length, and apparatuses 202B, 202D, 202F, and 202H may have variable focal length to ensure that every object in the surrounding is in focus.

Figure 4:
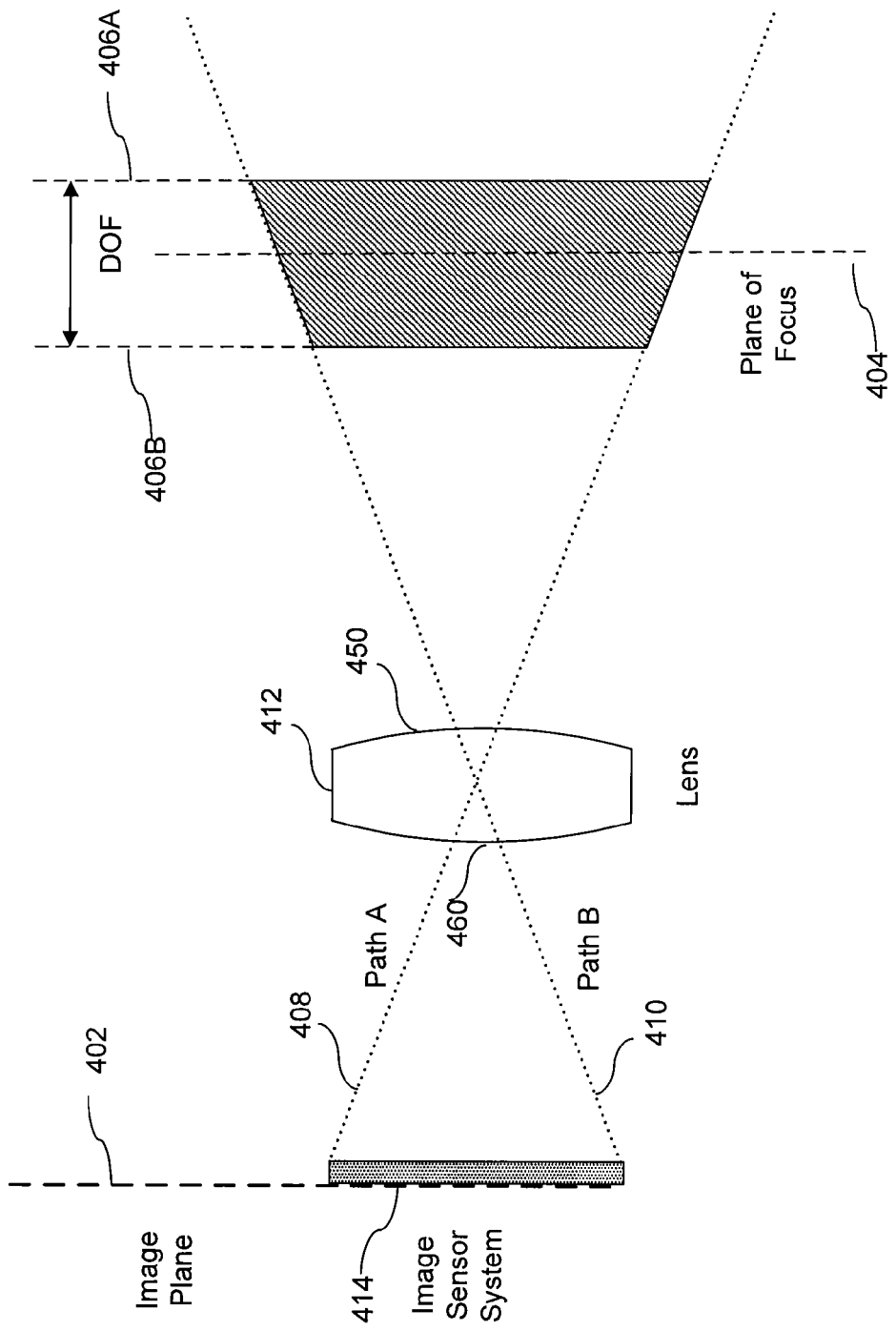
FIG. 4 illustrates example components of an imaging apparatus, according to an embodiment of the present invention.

FIG. 4 illustrates example components of an imaging apparatus 202, according to an embodiment of the present invention. Apparatus 202 comprises a lens 412, and an image sensor system 414. Lens 412 may include a single lens, multiple lenses, or multiple lenses housed in an assembly. Image sensor system 414 may be an electronic sensor, or a chemical or optical-based sensor. Image sensor system 414 is discussed in greater detail with reference to FIG. 7. In the particular embodiment shown in FIG. 4, the image plane 402 of the image sensor system 414 is parallel to the plane of focus 404, and the focal lengths on each side of image sensor system 414, as indicated by path A 408 and path B 410 are equal in distance. This results in an area where objects located between 406A and 406B, as shown by the shaded area, will be in focus at the image sensor system 414. The shaded area between 406A and 406B is referred to as the depth of field (DOF). Therefore, as an example, when a planar object, such as the side of a building located on a side of a street, is parallel to the image plane, it coincides with the plane of focus, and the entire object will be rendered sharply. The embodiment shown in FIG. 4 represents a situation with fixed focal length, as applicable to imaging apparatuses 202A, 202C, 202E, and 202G of FIG. 3. However, when the object plane is not parallel with the image plane, the image sensor system 414 may be tilted at an appropriate angle, as in the cases of variable focal-length imaging apparatuses 202B, 202D, 202F, and 202H.

In embodiments of the present invention, the optical profile of lens 412 is configured to introduce variable amounts of distortion to rectilinear images of objects along an object plane within the DOF of imaging apparatus 202. One or both surfaces 450 and 460 of the lens 412, and/or the thickness of the lens 412 may be tailored to reproduce a predetermined tuned distortion curve corresponding to an angular field of view.

Figure 5:
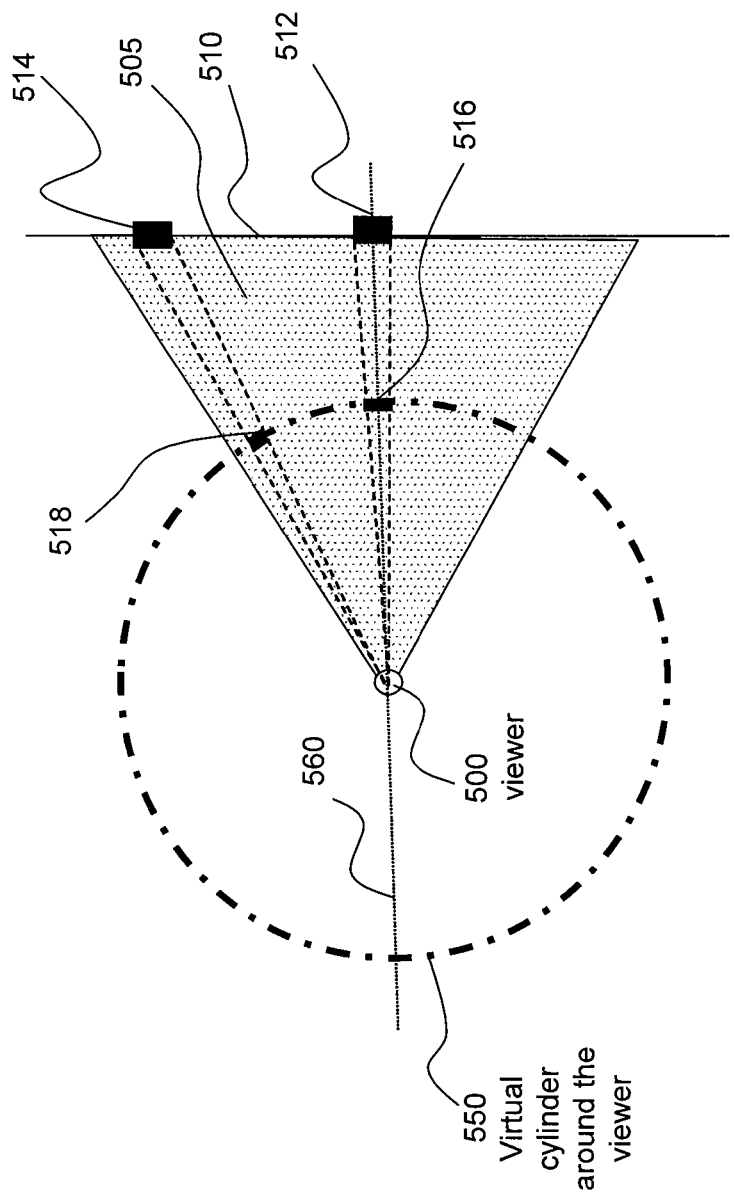
FIG. 5 illustrates conventional non-distortion-tuned projection of pixels of a rectilinear image on a virtual cylinder, resulting in a non-uniform resolution along the surface of the virtual cylinder, according to embodiments of the present invention.

FIG. 5 illustrates inaccuracies resulting from images taken using non-distortion-tuned optics that are then projected onto a virtual cylinder for viewing. In FIG. 5, a 360-degree panoramic image is projected along the surface of a virtual cylinder 550 centered around a viewer 500. For illustrative purposes, it is assumed that FIG. 5 is a top view. The 360-degree panoramic image comprises consecutive stitched-together segments of projected rectilinear images within respective fields of view of individual imaging apparatuses 202 in the horizontal direction. For example, rectilinear image 510 is bound by the horizontal angular field of view 505 (the shaded region) of imaging apparatus 202C. Rectilinear image 510 is created by a lens receiving the object image, such as lens 412 in FIG. 4. It is readily seen that the width of a virtual pixel projected on the surface of the virtual cylinder 550 varies depending on the position of the source pixel along the rectilinear image of objects along an object plane. For example, a source pixel 512 along the central axis 560 of the rectilinear image 510 is projected as virtual pixel 516 along the surface of virtual cylinder 550, and a source pixel 514 at an edge of the rectilinear image 510 is projected as virtual pixel 518 along the surface of virtual cylinder 550. Width of virtual pixel 516 is larger than the width of virtual pixel 518, though both the source pixels 512 and 514 are of the same width along the rectilinear image 510. Thus, the viewer 500 sees a projected segment of panoramic image with non-uniform resolution, and the image appears distorted.

Figure 6:
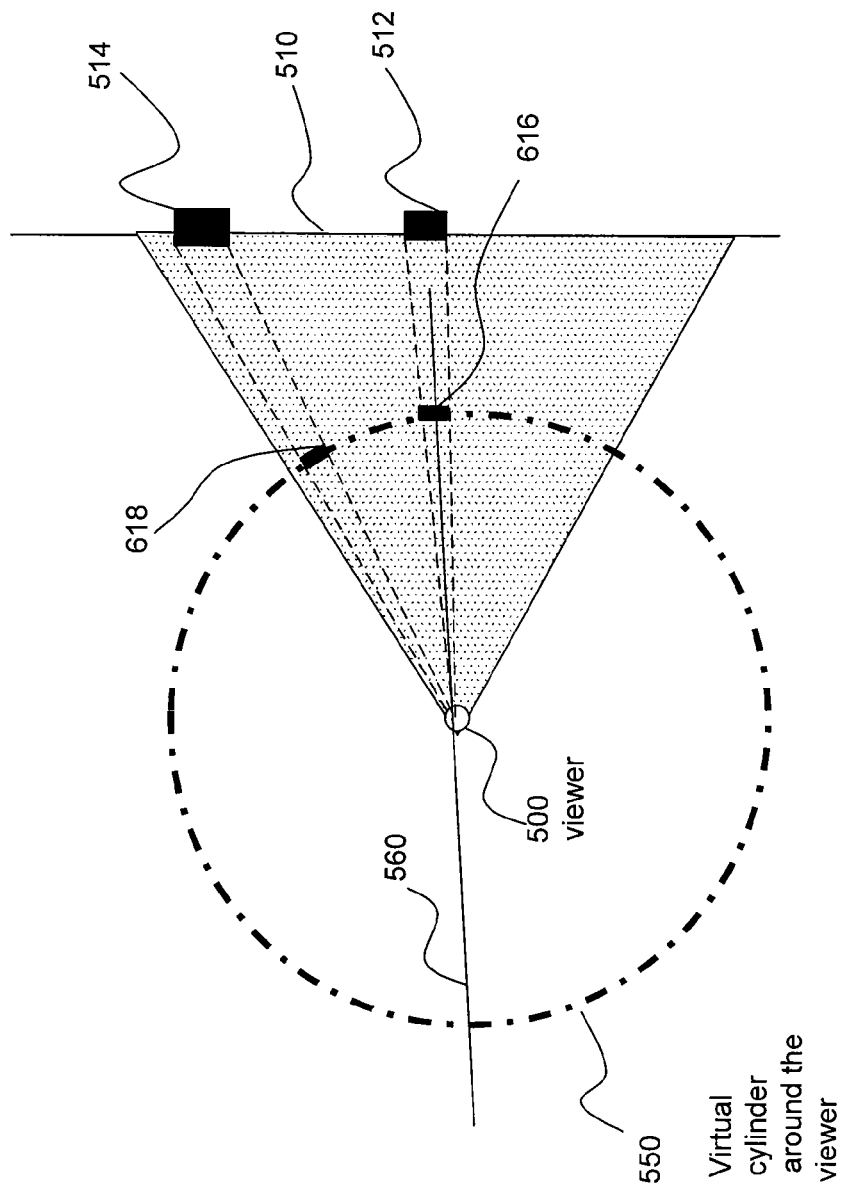
FIG. 6 illustrates distortion-tuned projection of pixels of a rectilinear image on the virtual cylinder, resulting in a uniform resolution along the surface of the virtual cylinder, according to embodiments of the present invention.

According to embodiments, this problem may be solved by deliberately adding varying amounts of distortion to the lens producing the rectilinear image such that uniform resolution is maintained when the rectilinear source pixels are projected onto their respective locations along the surface of the virtual cylinder, as shown in FIG. 6. Minimum or zero distortion is applied to source pixel 512, which is projected as virtual pixel 616, located along the central axis 560 of the rectilinear image. Increasing amounts of distortion are applied to the source pixels as their distance from the central axis 560 increases. For example, distortion in the lens receiving the object image causes the width of source pixel 514 to increase with respect to the width of source pixel 512, so that the width of virtual pixel 618 will also increase with respect to virtual pixel 616 when mapped to the surface of virtual cylinder 550. Due to the application of the tuned distortion curve, the width of all the virtual pixels may become uniform along the surface of the virtual cylinder 550. Thus, width of virtual pixel 618 is equal to the width of virtual pixel 616. As a result, the viewer 500 sees a panoramic image with uniform resolution.

It is to be appreciated that though the discussion with reference to FIGS. 5 and 6 assumes a top view corresponding to horizontal angular field of view for illustrative purposes, similar discussion is applicable to vertical angular field of view, where the viewer looks up and down instead of looking from side to side. Embodiments of the present invention are not limited to horizontal angular fields of view only, and are equally applicable to vertical angular fields of view.

In the embodiments described herein, the desired distortion-tuning may be incorporated in the profile of the lens 412 only in the horizontal direction, or in the vertical direction, or in both horizontal and vertical directions. The distortion tuning is achieved by tailoring the physical parameters, such as, the thickness and/or the surface profile, of the lens. An optical modeling software, such as Zemax, produced by Zemax Development Corporation of Bellevue, Wash., may be used to determine the physical parameters of the lens that may introduce the desired distortion-tuning based on the field of view. However, typically, no software-based image-post-processing is involved to achieve the desired distortion-tuning once the image has been captured.

Figure 7:
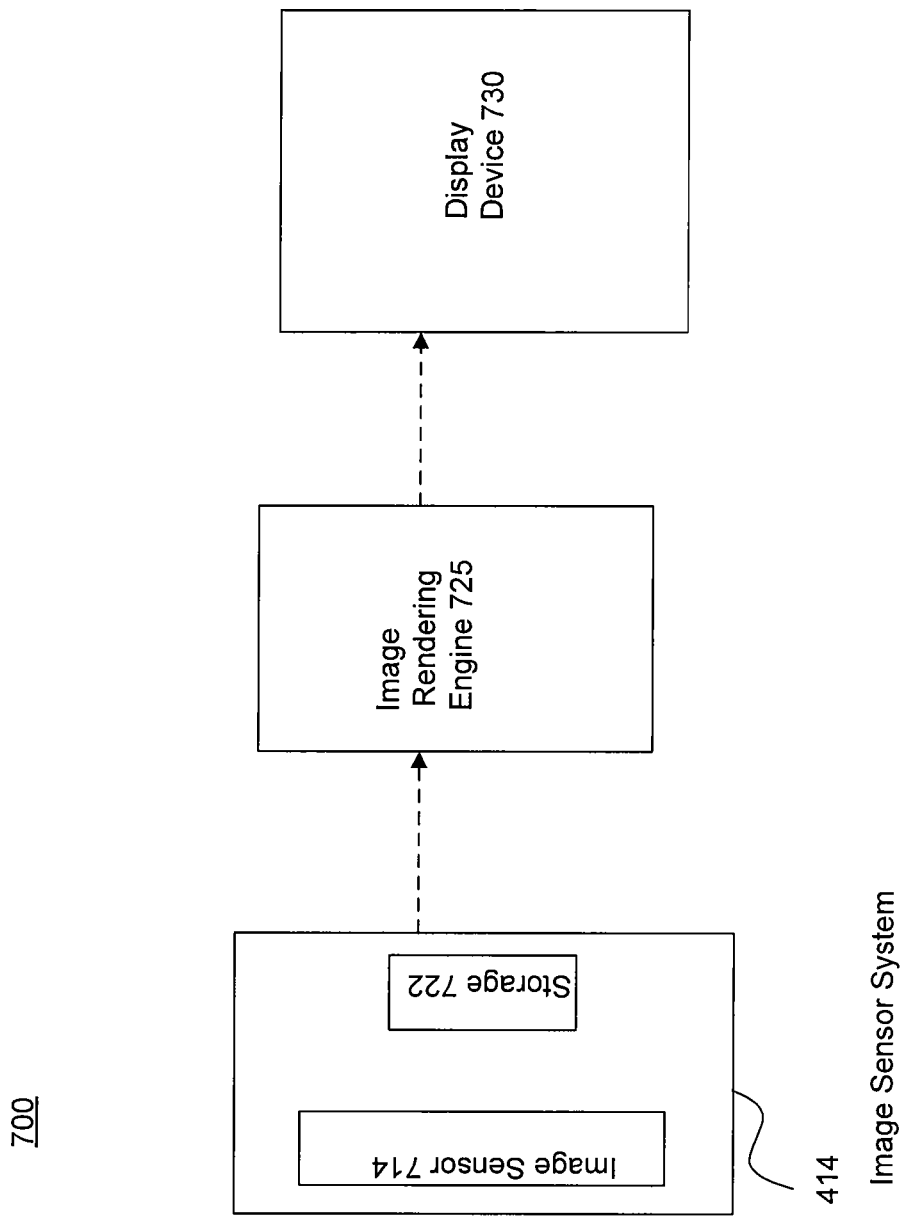
FIG. 7 illustrates example components for displaying a distortion-tuned image, according to an embodiment of the present invention.

FIG. 7 illustrates example components of a system 700 for displaying a distortion-tuned image. System 700 comprises an image sensor system 414 (as discussed before with respect to FIG. 4), an image rendering engine 725 coupled to the image sensor system 414, and a display device 730, coupled to the image rendering engine. Image sensor system 414 comprises at least an image sensor 714 and a storage device 722. There may be other functional components in the image sensor system not shown in FIG. 7.

Optics-based image sensor embodiments include an optical image sensor 714. Typically, in embodiments described herein, distortion-tuning lens 412 is disposed between the objects of the scene to be captured and the image sensor system 414, so that the input to image sensor system 414 is a distortion-tuned image produced by lens 412. However, other arrangements may be employed without departing from the spirit and scope of the present invention.

In embodiments, the resultant distortion-tuned image may be stored in a storage device 722. Storage device 722 may be an electronic, optical, or magnetic storage device.

In further embodiments, the stored image may be transferred to an image rendering engine 725, which is capable of rendering the distortion-tuned image onto a virtual cylinder surface. Image rendering engine 725 may also be capable of displaying the rendered image to a display device 730. In an embodiment, image rendering engine 725 displays the rendered image on a substantially flat rectangular portion of a screen of display device 730. Display device 730 may be, for example and without limitation, a desktop or laptop computer, a hand-held device, a mobile phone, a global positioning system (GPS), or any other electronic device configured to display an image. In embodiments described herein, the image rendering engine 725 may include, for example, Adobe Flash Player produced by Adobe Systems Incorporated of San Jose, Calif. The rendered image on the screen of the display device is the rectilinear reproduction of a panoramic image along the surface of the virtual cylinder 550, as shown in FIG. 6.

Figure 8:
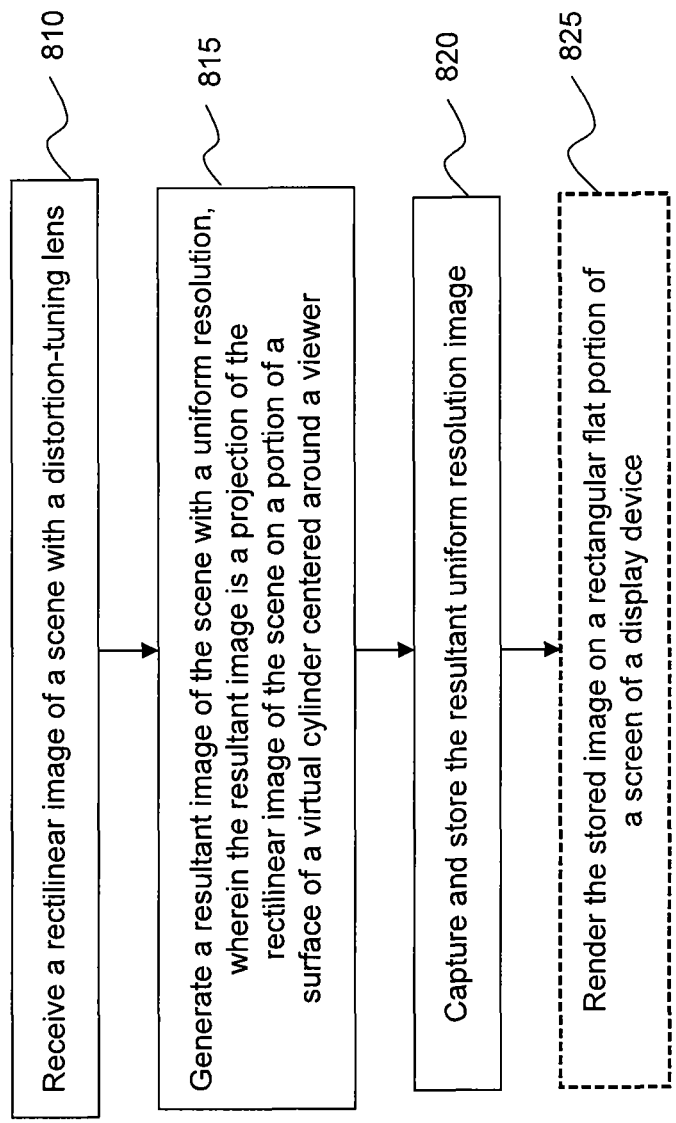
FIG. 8 shows a flowchart listing example method steps performed in accordance with embodiments of the present invention.

FIG. 8 shows a flowchart of a method 800, comprising example steps for producing and rendering a panoramic image with uniform resolution. The steps of method 800 are for illustrative purpose only, and do not have to take place in the order shown. There may be additional intermediate steps that are not shown in method 800. Some of the steps may be optional, and/or specific to particular embodiments.

Method 800 starts at step 810, in which an image is received with a lens having an optical profile configured to introduce variable amounts of distortion to individual points of a rectilinear image of a scene within an angular field of view of the lens.

Method 800 then proceeds to step 815. In step 815, a resultant image of the scene is generated with a uniform resolution, wherein the resultant image is a projection of the rectilinear image of the scene on a portion of a surface of a virtual cylinder centered around a viewer.

In the next step 820, the resultant image is captured and stored.

In the optional next step 825, the stored image is rendered on a rectangular flat portion of a screen of a display device. In an example embodiment, image rendering engine building block 725 is capable of carrying out step 825 of method 800.

Embodiments of the present invention have been described above with the aid of functional building blocks illustrating the implementation of specified functions and relationships thereof. However, persons skilled in the art will appreciate that the boundaries of these functional building blocks have been arbitrarily defined herein for the convenience of the description. Alternate boundaries may be defined so long as the specified functions and relationships thereof are appropriately performed.

CONCLUSION

While various embodiments of the present invention have been described above, it should be understood that they have been presented by way of example only, and not limitation. It will be apparent to persons skilled in the relevant art that various changes in form and detail may be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. An imaging apparatus, comprising:
   a lens; and
   an image sensor system,
   wherein a physical structure of the lens has a built-in optical profile following a tuned distortion curve configured to introduce variable amounts of distortion to individual points of a rectilinear image of a scene within an angular field of view of the lens, such that a resultant image of the scene received by the image sensor system has a uniform resolution when the rectilinear image is projected on a portion of a surface of a virtual cylinder centered around a viewer, and
   wherein the image sensor system is configured to be coupled to an image rendering engine capable of mapping the resultant image of the scene on a substantially flat rectangular portion of a screen of a display device.

2. The apparatus of claim 1, wherein a finite number of the lenses is repeated radially in an arrangement such that a complete panoramic image of a viewer's surrounding is reproduced with a uniform resolution, when projected onto successive portions of the surface of the virtual cylinder.

3. The apparatus of claim 1, wherein the image sensor system includes a storage device that stores the resultant image of the scene.

4. The apparatus of claim 1, wherein a tilt angle of the image sensor system is adjusted to a desired depth of field of the lens.

5. The apparatus of claim 1, wherein the portion of the surface of the virtual cylinder is bound by the angular field of view of the lens.

6. The apparatus of claim 1, wherein the virtual cylinder has a predetermined radius.

7. The apparatus of claim 1, wherein the built-in optical profile of the lens is follows a predetermined tuned distortion curve corresponding to a horizontal angular field of view.

8. The apparatus of claim 1, wherein the built-in optical profile of the lens is follows a predetermined tuned distortion curve corresponding to a vertical angular field of view.

9. A method in an imaging apparatus, comprising:
(a) receiving an image with a lens, wherein the lens has a physical shape that introduces distortion according to a tuned distortion curve configured to introduce variable amounts of distortion to individual points of a rectilinear image of a scene within an angular field of view of the lens;
(b) generating a resultant image of the scene with a uniform resolution, wherein the resultant image is a projection of the rectilinear image of the scene on a portion of a surface of a virtual cylinder centered around a viewer;
(c) capturing and storing the resultant image of the scene; and
(d) mapping, using an image rendering engine, the stored resultant image of the scene on a substantially flat rectangular portion of a screen of a display device.

10. The method of claim 9, further comprising:
reproducing a complete panoramic image of a viewer's surrounding with a uniform resolution by stitching together rectilinear images projected on successive portions of the surface of the virtual cylinder by a finite number of lenses repeated successively in a radial arrangement.

11. An imaging apparatus, comprising:
a lens, wherein a physical structure of the lens has a built-in optical profile following a tuned distortion curve configured to introduce variable amounts of distortion to individual points of a rectilinear image of a scene within an angular field of view of the lens, such that a resultant image of the scene has a uniform resolution when the rectilinear image is projected on a portion of a surface of a virtual cylinder centered around a viewer, and
wherein the imaging apparatus is configured to be coupled to an image rendering engine capable of mapping the resultant image of the scene on a substantially flat rectangular portion of a screen of a display device.

12. The imaging apparatus of claim 11, further comprising an optical image sensor, wherein the lens is disposed in between the optical image sensor and the scene.

13. The imaging apparatus of claim 11, further comprising:
an optical image sensor that receives the rectilinear image of the scene; and
a storage device that stores the resultant image of the scene with uniform resolution, wherein the lens is disposed in between the optical image sensor and the storage device.

* * * * *